(12) United States Patent
Dong

(10) Patent No.: US 11,019,832 B2
(45) Date of Patent: Jun. 1, 2021

(54) REPLACEABLE FREEZER CYLINDER OF YOGURT OR ICE CREAM MACHINE

(71) Applicant: Lingyu Dong, Temple City, CA (US)

(72) Inventor: Lingyu Dong, Temple City, CA (US)

(*) Notice: Subject to any disclaimer, the term of this patent is extended or adjusted under 35 U.S.C. 154(b) by 131 days.

(21) Appl. No.: 16/151,328

(22) Filed: Oct. 3, 2018

(65) Prior Publication Data
US 2020/0107558 A1 Apr. 9, 2020

(51) Int. Cl.
*A23G 9/22* (2006.01)
*A23G 9/28* (2006.01)

(52) U.S. Cl.
CPC ............ *A23G 9/222* (2013.01); *A23G 9/224* (2013.01); *A23G 9/281* (2013.01)

(58) Field of Classification Search
CPC ......... A23G 9/222; A23G 9/224; A23G 9/281
USPC ........................................................ 62/346
See application file for complete search history.

(56) References Cited

U.S. PATENT DOCUMENTS

| | | | |
|---|---|---|---|
| 2003/0080644 A1* | 5/2003 | Nelson | H02K 7/14 310/196 |
| 2012/0137719 A1* | 6/2012 | Dong | F28F 13/06 62/340 |

FOREIGN PATENT DOCUMENTS

| | | | |
|---|---|---|---|
| CN | 206821898 U | * | 1/2018 |
| CN | 108208301 A | * | 6/2018 |

* cited by examiner

*Primary Examiner* — Steve S Tanenbaum
(74) *Attorney, Agent, or Firm* — Raymond Y. Chan; David and Raymond Patent Firm

(57) ABSTRACT

An expansion evaporator includes a heat exchanger and a replaceable freezer cylinder detachably received within a receiving channel of the heat exchanger, wherein the replaceable freezer cylinder has a feeding channel for raw material feeding therethrough to thermally communicate with the heat exchanger so as to form a frozen product within the feeding channel. The replaceable freezer cylinder is detached from the heat exchanger for cleaning purpose as the raw material is not contacted with the heat exchanger.

33 Claims, 4 Drawing Sheets

REPLACEABLE FREEZER CYLINDER OF YOGURT OR ICE CREAM MACHINE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an ice cream or yogurt machine, and more particularly to a replaceable freezer cylinder of the ice cream or yogurt machine, wherein the replaceable freezer cylinder is detachably coupled in a heat exchanger of the ice cream or yogurt machine to facilitate cleaning and replacement.

Description of Related Arts

Traditional ice cream and yogurt machines or makers are required to periodical wash and clean in order to prevent serious sanitary problems generated inside components of the ice cream machines or makers, especially the freezer cylinder of the ice cream or yogurt machine. For example, in the traditional washing method, the raw materials inside the freezer cylinder are required to be drained out first, and then the cleaning water and detergents are injected into the freezer cylinder for cleaning. However, the traditional cleaning and washing method for ice cream machines or markers have several drawbacks.

Accordingly, the conventional freezer cylinder is a heat exchanger for the heat exchanging process of making frozen product from raw material. In other words, when the raw material passes through the freezer cylinder, the raw material will be frozen to form the frozen product. The applicant respectfully disclosed the structure of freezer cylinder in different U.S. patent application Ser. Nos. 13/766,731, 13/385,246, and 12/462,107, entitled "Direct Expansion Evaporator".

In order to clean the interior of the freezer cylinder, the freezer cylinder must be detached from the machine. Then, all components of the freezer cylinder are required to be disassembled in order to each part of the components. It is worth mentioning that the freezer cylinder is connected to a refrigerant source to deliver refrigerant to the freezer cylinder in order to heat exchange with the raw material. The disassembly of the freezer cylinder may cause the damage of the refrigerant channel and the leakage of refrigerant.

In addition, each part of the components is required to be manually disassembled by hand or tools, so lots of labors and time need to be spent during the traditional cleaning and washing method. In other words, since the ice cream or yogurt machines and markers are required to be cleaned and washed periodically, the components are easily to be damaged and broken during disassembling. Furthermore, some areas of the freezer cylinder cannot be cleaned and washed, such as the cylinders and valves, so the cleaning and washing efficiency of the traditional washing and cleaning method is relatively lower, and the components which cannot be fully cleaned or washed and are easily eroded, and in such a manner, not only that components needs to be repaired, but also that the finished ice cream will be contaminated.

SUMMARY OF THE PRESENT INVENTION

The invention is advantageous in that it provides a replaceable freezer cylinder of the ice cream or yogurt machine, wherein the replaceable freezer cylinder is detachably coupled in a heat exchanger of the ice cream or yogurt machine to facilitate cleaning and replacement, so as to enhance the efficiency for cleaning and washing the replaceable freezer cylinder of the ice cream machine independently.

Another advantage of the invention is to a replaceable freezer cylinder of the ice cream or yogurt machine, wherein the heat exchanging process of the raw material is taken place within the replaceable freezer cylinder, such that the heat exchanger will not contact with the raw material to keep the cleanliness of the heat exchanger.

Another advantage of the invention is to a replaceable freezer cylinder of the ice cream or yogurt machine, which is relatively simple in structure and high efficient for heat exchanging process of making the frozen product while for keeping the heat exchanger clean.

Another advantage of the invention is to a replaceable freezer cylinder of the ice cream or yogurt machine, which can install into any existing heat exchanger of the ice cream or yogurt machine, so as to minimize the manufacturing cost of the replaceable freezer cylinder of the present invention for incorporating with the ice cream or yogurt machine.

Another advantage of the invention is to a replaceable freezer cylinder of the ice cream or yogurt machine, wherein the assembling and disassembling operation of the replaceable freezer cylinder is easy and simple by sliding in-and-out the replacement freezer cylinder at the receiving channel of the heat exchanger.

Another advantage of the invention is to a replaceable freezer cylinder of the ice cream or yogurt machine, wherein no expensive or complicated structure is required to employ in the present invention in order to achieve the above mentioned objects. Therefore, the present invention successfully provides an economic and efficient solution for providing an effective tool to keep the heat exchanger clean.

Additional advantages and features of the invention will become apparent from the description which follows, and may be realized by means of the instrumentalities and combinations particular point out in the appended claims.

According to the present invention, the foregoing and other objects and advantages are attained by an expansion evaporator of an ice cream or yogurt machine, comprising:

a heat exchanger having a receiving channel; and a replaceable freezer cylinder detachably received within the receiving channel, wherein the replaceable freezer cylinder has a feeding channel for raw material feeding therethrough to thermally communicate with the heat exchanger so as to form a frozen product within the feeding channel, wherein the replaceable freezer cylinder is capable of being detached from the heat exchanger for cleaning purpose as the raw material is not contacted with the heat exchanger.

In accordance with another aspect of the invention, the present invention comprises a replaceable freezer cylinder for an ice cream or yogurt machine which comprises a heat exchanger having a receiving channel, wherein the replaceable freezer cylinder comprises a surrounding wall for thermally contacting with the heat exchanger, wherein the surrounding wall defines a feeding channel therewithin for raw material feeding therethrough to thermally communicate with the heat exchanger so as to form a frozen product within the feeding channel, wherein the replaceable freezer cylinder is arranged for detachably receiving within the receiving channel, such that the replaceable freezer cylinder is capable of detaching from the heat exchanger for cleaning purpose as the raw material is not contacted with the heat exchanger.

In accordance with another aspect of the invention, the present invention comprises a method of cleaning an expansion evaporator of an ice cream or yogurt machine, comprising the following steps.

(A) Slidably remove a replaceable freezer cylinder from a receiving channel of heat exchanger.

(B) Rinse a feeding channel of the replaceable freezer cylinder where raw material being fed therein to heat exchange with the heat exchanger.

(C) Slide the replaceable freezer cylinder back into the receiving channel of the heat exchanger.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
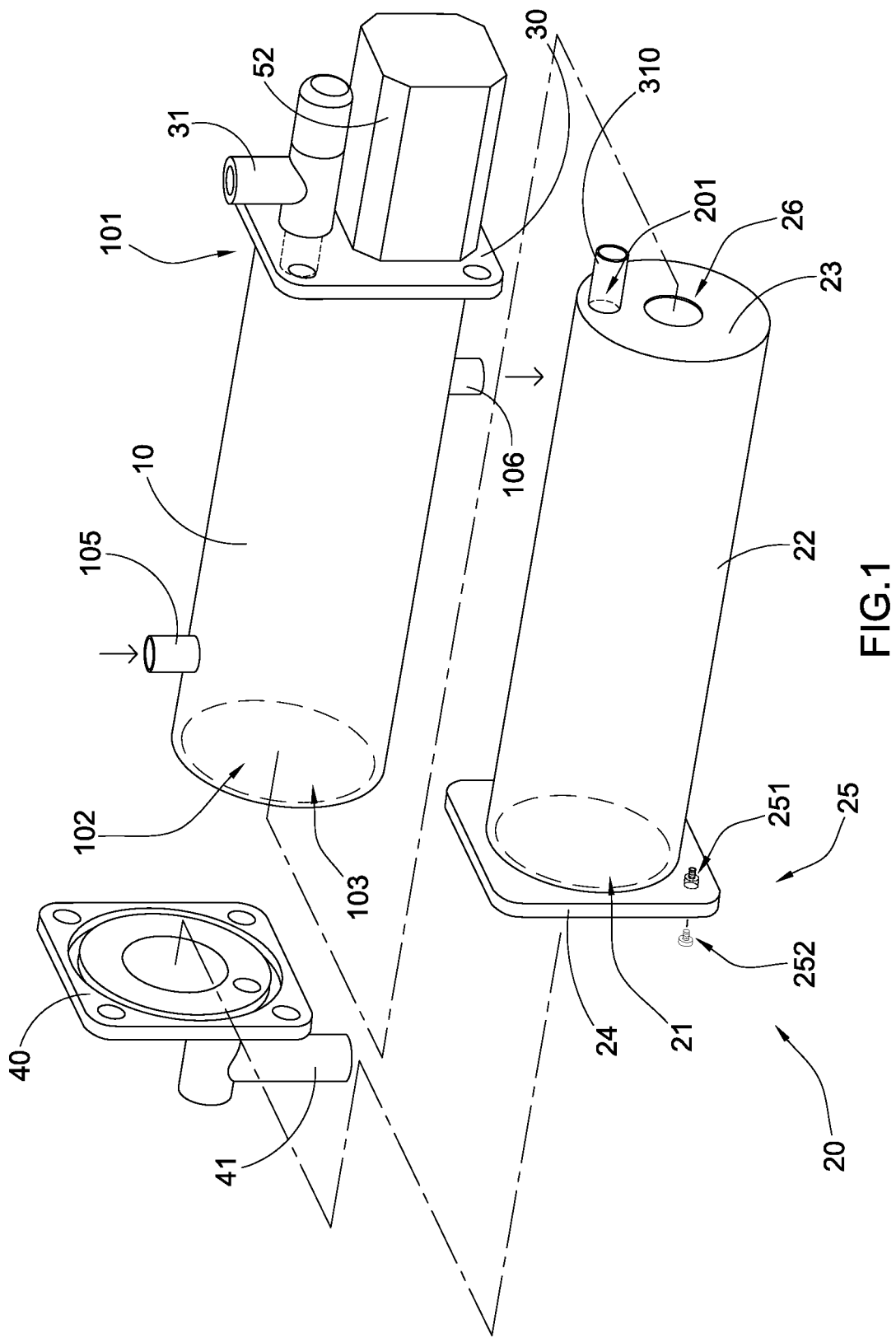
FIG. 1 is an exploded perspective view of an expansion evaporator of an ice cream or yogurt machine according to a preferred embodiment of the present invention, illustrating a replaceable freezer cylinder detachably receiving in a heat exchanger.
Figure 3:
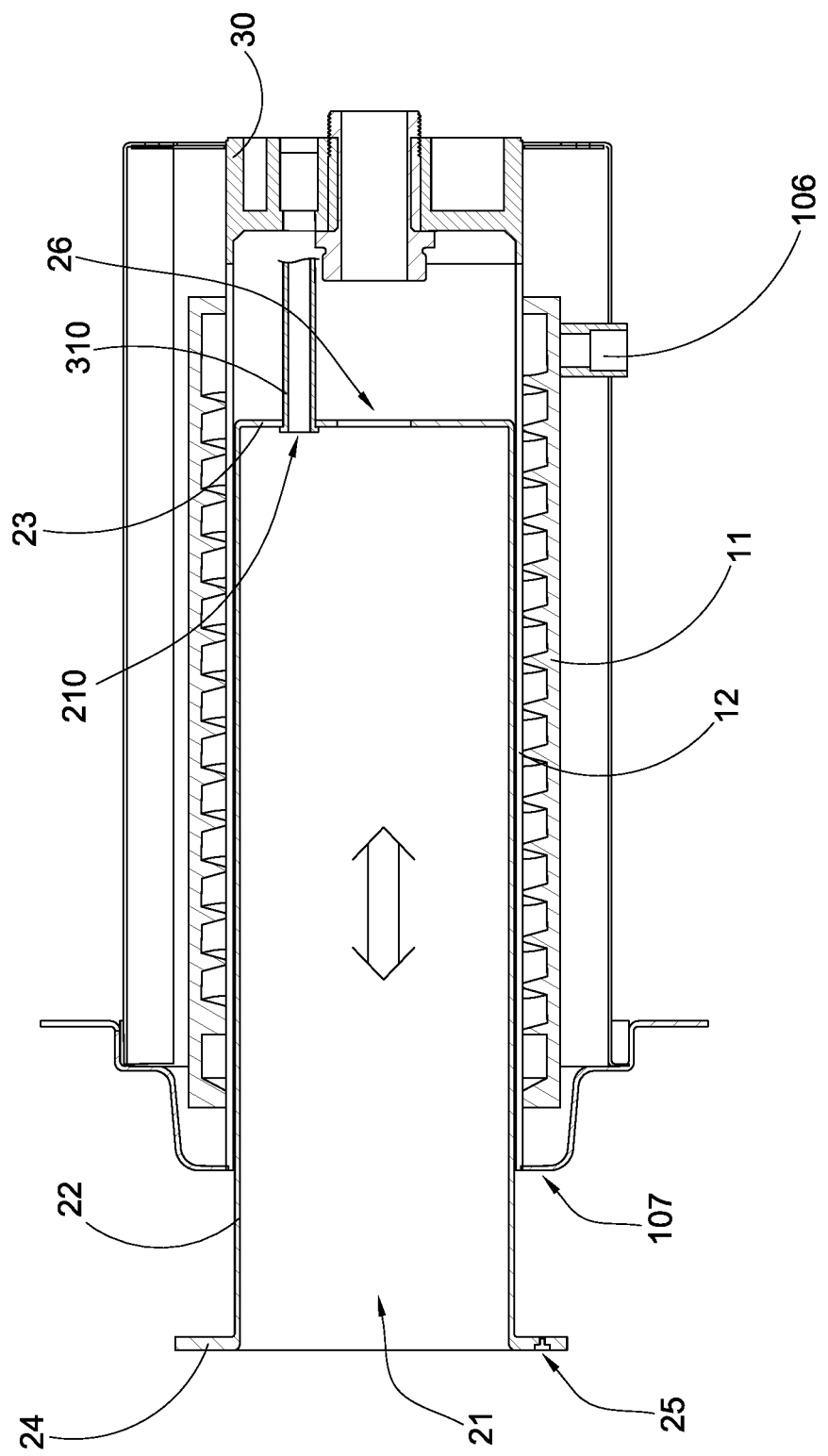
FIG. 3 illustrates the replaceable freezer cylinder sliding in a receiving channel of the heat exchanger according to the above preferred embodiment of the present invention.

Referring to FIGS. 1 and 3 of the drawings, an expansion evaporator of an ice cream or yogurt machine according to a preferred embodiment of the present invention is illustrated, wherein the expansion evaporator comprises a heat exchanger 10 and a replaceable freezer cylinder 20.

Figure 2:
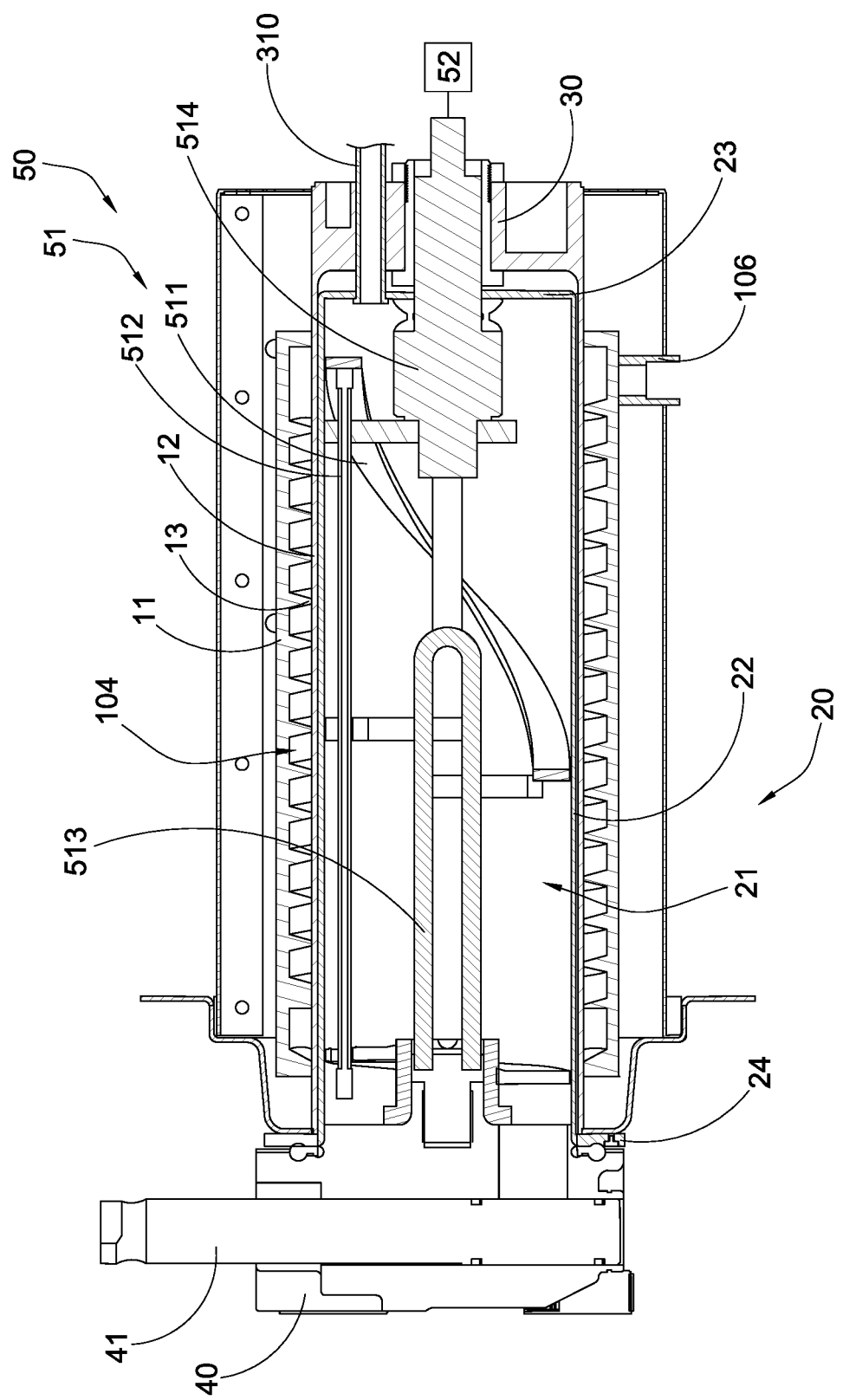
FIG. 2 is a sectional view of the expansion evaporator according to the above preferred embodiment of the present invention.

As shown in FIGS. 2 and 3, the heat exchanger 10 has a feeding end 101 and a dispensing end 102 to define a receiving channel 103 therebetween, wherein the replaceable freezer cylinder 20 is detachably received in the receiving channel 103 of the heat exchanger. The heat exchanger 10 further comprises an outer guiding duct 11 and an inner guiding duct 12 coaxially enclosed within the outer guiding duct 11 to define the receiving channel 103 within the inner guiding duct 12 and a heat exchange channel 104 between the outer and inner guiding ducts 11, 12.

The heat exchanger 10 further has a refrigerant inlet 105 and a refrigerant outlet 106 spacedly provided at the outer guiding duct 12 to communicate with the heat exchange channel 104 to communicatively connect to a refrigerant source, wherein a flow of refrigerant is supplied by the refrigerant source and is guided to pass through the heat exchange channel 104 from the refrigerant inlet 105 to the refrigerant outlet 106.

In one embodiment, the heat exchange channel 104 is extended around the inner guiding duct 11 in a spiral manner to prolong the traveling distance of the refrigerant from the refrigerant inlet 105 to the refrigerant outlet 106. According to the preferred embodiment, the heat exchanger 10 further comprises a guiding wall 13 extended between the outer guiding duct 11 and the inner guiding duct 12 in a spiral manner in order to form the heat exchange channel 104.

The replaceable freezer cylinder 20, having a circular cross section, is detachably received within the receiving channel 103 of the heat exchanger 10, wherein the replaceable freezer cylinder 20 has a feeding channel 21 for raw material feeding therethrough to thermally communicate with the heat exchanger 10 so as to form a frozen product within the feeding channel 103. The feeding channel 21 of the replaceable freezer cylinder 20 communicates between the feeding end 101 and the dispensing end 102 of the heat exchanger 10. In other words, the feeding channel 21 of the replaceable freezer cylinder 20 is thermally communicated with the heat exchange channel 104, wherein the raw material in the feeding channel 104 will thermally conduct with the refrigerant within the heat exchange channel 104 to ensure the raw material being frozen within the feeding channel 104 by the refrigerant. Therefore, the raw material will guide to pass through an interior of the inner guiding duct 11 of the heat exchanger 10 but will not contacted with any surface of the inner guiding duct 11 of the heat exchanger 10 to keep the heat exchanger 10 clean. As a result, the replaceable freezer cylinder 20 is capable of being detached from the heat exchanger 10 for cleaning purpose.

In one embodiment, the replaceable freezer cylinder 20 is coaxially coupled within the inner guiding duct 11 and is coaxially aligned within the outer guiding duct 12, wherein the feeding channel 21 is coaxially aligned with the receiving channel 103 of the heat exchanger 10. In addition, a feeding direction of the raw material along the feeding channel 21 is opposite to a flowing direction of the refrigerant along the heat exchange channel 104 at a longitudinal direction of the heat exchanger 10. A feeding line of the raw material is defined at the raw material being fed into the feeding channel 21 at the feeding direction.

According to the preferred embodiment, the replaceable freezer cylinder 20 is made of high thermal conductive material to ensure the refrigerant at the heat exchanging channel 104 being heat exchanged with the raw material within the feeding channel 21 of the replaceable freezer cylinder 20. The replaceable freezer cylinder 20 comprises a surrounding wall 22 defining the feeding channel 21 therewithin, a rear end wall 23 integrally extended from at one end of the surrounding wall 22, and an outer biasing rim 24 outwardly and integrally extended from an opposed end of the surrounding wall 22. The surrounding wall 22 is thermally contacted with an inner duct wall of the inner guiding duct 11 when the replaceable freezer cylinder 20 is received within the receiving channel 103 of the inner guiding duct 10. It is worth mentioning that an outer diameter of the replaceable freezer cylinder 20 matches with an inner diameter of the heat exchanger 10. In particular, an outer diameter of the surrounding wall 22 matches with a diameter of the receiving channel 103, such that the surrounding wall 22 is tightly contacted with an inner duct wall of the inner guiding duct 11 to ensure the thermal conduction between the refrigerant at the heat exchanging channel 104 and the raw material within the feeding channel 21.

The surrounding wall 22 has a rear closed end and a front open end to define the feeding channel 21 therebetween, wherein the rear end wall 23 is formed at the closed end of the surrounding wall 22 while the outer biasing rim 24 is formed at the open end of the surrounding wall 22. The closed end of the surrounding wall 22 is located close to the feeding end 101 of the heat exchanger 10, such that the rear end wall 23 of the replaceable freezer cylinder 20 faces toward the feeding end 101 of the heat exchanger 10. The open end of the surrounding wall 22 is extended to the dispensing end 102 of the heat exchanger 10. It is worth mentioning that the raw material is fed into the feeding channel 21 at a direction from the closed end of the surrounding wall 22 to the open end thereof which corresponds to the longitudinal direction of the heat changer 10 from the feeding end 101 to the dispensing end 102. The refrigerant is guided to flow along the heat exchanging channel 104 at a spiral manner at the longitudinal direction of the heat changer 10 from the dispensing end 102 to the feeding end 101.

According to the preferred embodiment, an outer diameter of the front end of the surrounding wall 22 of the replaceable freezer cylinder 20 is preferred to be slightly smaller than an outer diameter of the rear end of the surrounding wall 22 of the replaceable freezer cylinder 20. In particular, the surrounding wall 22 is a tapered circular wall extending from the rear end to the front end thereof. Correspondingly, the receiving channel 103 of the heat exchanger 10 is also in taper shape, wherein an inner diameter of the dispensing end 102 of the heat exchanger 10, which matches the diameter of the front end of the surrounding wall 22 of the replaceable freezer cylinder 20, is slightly smaller than the feeding end 101 of the heat exchanger 10, which matches with the diameter of the front end of the surrounding wall 22 of the replaceable freezer cylinder 20, such that the tapered surrounding wall 22 and the receiving channel 103 further facilitates the detaching of the replaceable freezer cylinder 20 from the heat exchanger 10 and the insertion of the replaceable freezer cylinder 20 into the receiving channel 103 of the heat exchanger 10 coaxially.

According to the preferred embodiment, the replaceable freezer cylinder 20 has a feeding inlet 201 alignedly coupled at the feeding end 101 of the heat exchanger 10 for allowing the raw material being fed into the feeding channel 21 therefrom, and a feeding outlet 202 alignedly coupled at the dispensing end 102 of the heat exchanger 10 for dispensing the frozen product from the feeding channel 21.

As shown in FIGS. 1 and 2, the feeding inlet 201 of the replaceable freezer cylinder 20 is formed at the rear end wall 23 thereof. In one embodiment, the feeding inlet 201 is a through hole formed the rear end wall 23 of the replaceable freezer cylinder 20 to communicate with the feeding channel 21. Therefore, the raw material is fed into the feeding channel 21 of the replaceable freezer cylinder 20 from the feeding inlet 201 thereof.

The feeding outlet 202 of the replaceable freezer cylinder 20 is defined at the open end of the surrounding wall 22. In other words, a diameter of the feeding inlet 201 of the replaceable freezer cylinder 20 is smaller than that of the feeding outlet 202 of the replaceable freezer cylinder 20. In addition, the feeding outlet 202 of the replaceable freezer cylinder 20 is alignedly coupled at the dispensing end 102 of the heat exchanger 10 for dispensing the frozen product from the feeding channel 21.

The outer biasing rim 24, having a panel structure, is outwardly extended from the open end of the surrounding wall 22 to bias against a front side 107 of the heat exchanger 10. The outer biasing rim 24 has multiple functions for the replaceable freezer cylinder 20. The outer biasing rim 24 is a handle frame to slide the replaceable freezer cylinder 20 in and out the receiving channel 103 of the heat exchanger 10. The outer biasing rim 24 is also a guiding frame to guide the sliding location of the replaceable freezer cylinder 20, wherein when the outer biasing rim 24 is biased against the front side 107 of the heat exchanger 10, the feeding inlet 201 and the feeding outlet 202 of the replaceable freezer cylinder 20 are aligned with the feeding end 101 and the dispensing end 102 of the heat exchanger 10 respectively.

According to the preferred embodiment, the replaceable freezer cylinder 20 further comprises a pusher arrangement 25 for removing the surrounding wall 21 away from the receiving channel 103 of the heat exchanger 10. The surrounding wall 22 is hard to be removed from the receiving channel 103 of the heat exchanger 10 as the outer biasing rim 24 is biased against the front side 107 of the heat exchanger 10. The pusher arrangement 25 is provided at the outer biasing rim 24 to create a clearance between the outer biasing rim 24 and the front side 107 of the heat exchanger 10, such that the surrounding wall 22 of the replaceable freezer cylinder 20 can be easily slid out of the receiving channel 103 of the heat exchanger 10 via the outer biasing rim 24.

Figure 4:
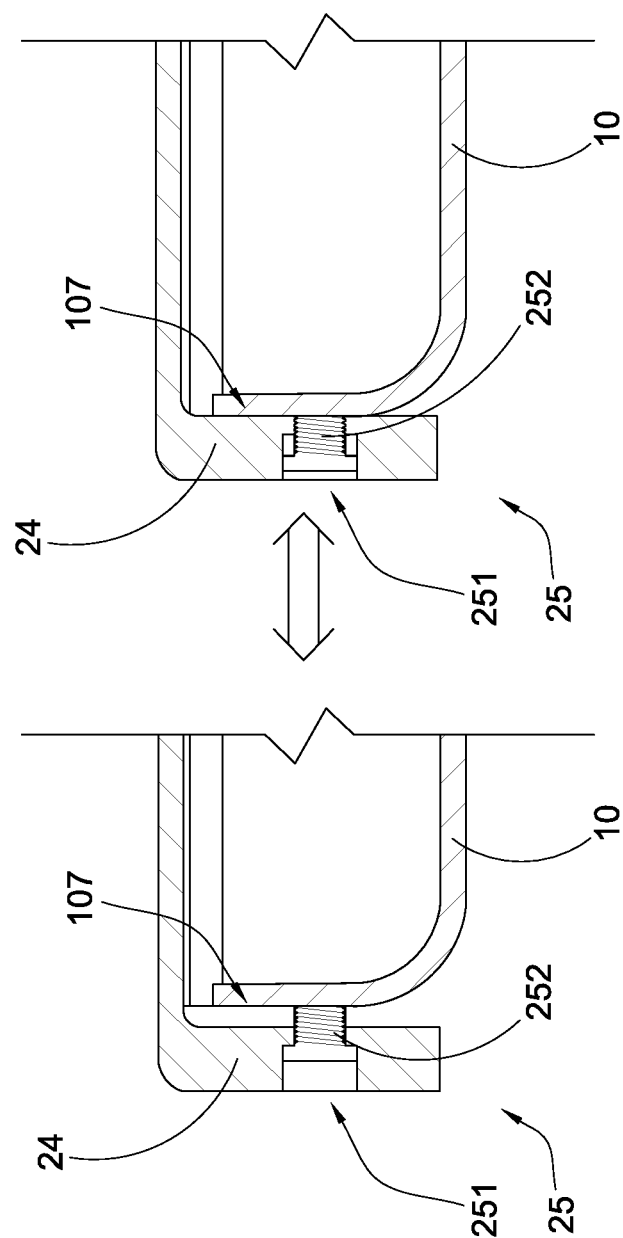
FIG. 4 is a sectional view of a pusher arrangement of the replaceable freezer cylinder according to the above preferred embodiment of the present invention, illustrating the pusher arrangement pushing against the heat exchanger.

As shown in FIG. 4, the pusher arrangement 25 comprises a threaded pusher slot 251 formed at the outer biasing rim 24 and a pusher member 252 rotatably coupled at the pusher slot 251. The pusher slot 251 is a through slot formed at the outer biasing rim 24, wherein a length of the pusher slot 251 is a thickness of the outer biasing rim 24. The pusher member 252 has an actuating end and an opposed pusher end, wherein a length of the pusher member 252 between the actuating end and the pusher end is shorter than the length of the pusher slot 251. When the actuating end of the pusher member 252 is actuated to rotate the pusher member 252 at a position that the pusher end thereof is located within the pusher slot 251, the outer biasing rim 24 is biased against and overlapped with the front side 107 of the heat exchanger 10 that no clearance is formed therebetween. This position refers as an installation position that the replaceable freezer cylinder 20 is installed and received in the receiving channel 103 of the heat exchanger 10. When the actuating end of the pusher member 252 is actuated to rotate the pusher member 252 at a position that the pusher end thereof is protruded out of the pusher slot 251, the pusher end of the pusher member 252 is biased against the front side 107 of the heat exchanger 10 to push the outer biasing rim 24 away from the front side 107 of the heat exchanger 10. As a result, the replaceable freezer cylinder 20 is slightly slid out of the receiving channel 103 of the heat exchanger 10 and the clearance is formed between the outer biasing rim 24 and the front side 107 of the heat exchanger 10. Then, the operator is able to hold the outer biasing rim 24 and pull out the replaceable freezer cylinder 20 from the receiving channel 103 of the heat exchanger 10.

According to the preferred embodiment, the expansion evaporator further comprises a rear frame 30 coupled at the feeding end 101 of the heat exchanger 10 to enclose the inner guiding duct 12, wherein the rear frame 30 comprises a material delivering pipe 31 extended into the feeding channel 21 of the replaceable freezer cylinder 20 through a material delivering tube 310 for feeding the raw material into the feeding channel 21 via the material delivering tube 31. An inlet end of the material delivering tube 310 is connected to a material source while an outlet end of the material delivering tube 310 is inserted into the feeding slot 201 of the replaceable freezer cylinder 20 and is extended into the feeding channel 21 thereof. Therefore, the raw material can be directly fed into the feeding channel 21 of the replaceable freezer cylinder 20 without contacting with the inner guiding duct 12 of the heat exchanger 10.

According to the preferred embodiment, the outlet end of the material delivering tube 310 can be sealedly affixed to the replaceable freezer cylinder 20 so that the material delivering tube 310 is able to be detached with the replaceable freezer cylinder 20 from the heat exchanger 10 for cleaning and washing with the replaceable freezer cylinder 20 together to further meet the sanitary requirement of the ice cream or yogurt machine.

The expansion evaporator further comprises a front cover panel 40 detachably coupled at the front side 107 of the heat exchanger 10 to seal and cover the delivering end 102 thereof. The front cover panel 40 further covers at the feeding outlet 202 of the replaceable freezer cylinder 20. The front cover panel 40 has a material outlet tube 41 extended therefrom to communicate with the feeding channel 21 of the replaceable freezer cylinder 20. One end of the material outlet tube 41 is extended to the feeding outlet 202 of the replaceable freezer cylinder 20 while another end of the material outlet tube 41 is arranged to dispense the frozen product formed within the replaceable freezer cylinder 20. Accordingly, the outer biasing rim 24 of the replaceable freezer cylinder 20 is sandwiched between the front side 107 of the heat exchanger 10 and the front cover panel 40 to ensure the material outlet tube 41 communicating with the feeding outlet 202 of the replaceable freezer cylinder 20. Preferably, the outer biasing rim 24 of the replaceable freezer cylinder 20 is covered by and hidden behind the front cover panel 40. It is worth mentioning that the front cover panel 40 can be detached from the heat exchanger 10, such that the material outlet tube 41 can be rinsed to keep the cleanliness of the feeding line of the raw material.

The expansion evaporator further comprises a mixing module 50 for enhancing the transformation from the raw material to the frozen product within the feeding channel 103 of the replaceable freezer cylinder 20. Accordingly, the mixing module 50 comprises a beater device 51 rotatable in the feeding channel 103 of the replaceable freezer cylinder 20 and a motor device 52 driving the beater device 51 to rotate to mix and stir the raw material within the feeding channel 103.

The beater device 51 is detachably supported within the feeding channel 103 of the replaceable freezer cylinder 20. In one embodiment, the beater device 51 comprises a mixing paddle 511 being rotated to mix the raw material and/or frozen product and to push the raw material and/or frozen product from the feeding inlet 201 of the replaceable freezer cylinder 20 toward the feeding outlet 202 thereof. Preferably, the mixing paddle 511 has a helical configuration. The beater device 51 further comprises a scraper blade 512 contacting with an inner surface of the surrounding wall 22, wherein the scraper blade 512 is driven to rotate around the feeding channel 21 so as to remove the raw material and/or frozen product from the inner surface of the surrounding wall 22 back into the feeding channel 21. As the raw material being chilled in the feeding channel 21, the frozen product may accumulated at the inner surface of the surrounding wall 22, such that the scraper blade 512 prevents any raw material and/or frozen product accumulated at the inner surface of the surrounding wall 22.

The beater device 51 further comprises an axle member, wherein the mixing paddle 511 and the scraper blade 512 are supported and surrounded by the axle member. Accordingly, the axle member defines a front axle shaft 513 extended toward at the dispensing end 102 of the heat exchanger 10 and a rear axle shaft 514 extended through the rear end wall 23 of the replaceable freezer cylinder 20 to detachably couple with the motor device 52. Therefore, when the axle member is driven to rotate, the mixing paddle 511 is rotated to mix and push the raw material and, at the same time, the scraper blade 512 is moved to press against the inner surface of the surrounding wall 22 to scrape the raw material thereat.

Accordingly, the motor device 52 is supported by the rear frame 30 to detachably couple the rear axle shaft 514. In other words, when the beater device 51 is slid into the feeding channel 21 of the replaceable freezer cylinder 20, the rear axle shaft 514 is aligned with and coupled to the motor device 52 in order to ensure the mixing paddle 511 and the scraper blade 512 being supported in the feeding channel 21.

As shown in FIGS. 1 to 3, the replaceable freezer cylinder 20 further has a center through slot 26 formed at the rear end wall 23, wherein the rear axle shaft 514 of the beater device 51 is extended through the center through slot 26 of the replaceable freezer cylinder 20. Accordingly, the center through slot 26 is formed at a center of the rear end wall 23 to ensure the movements of the mixing paddle 511 and the scraper blade 512. It is worth mentioning that the center through slot 26 and the feeding slot 201 are formed at the rear end wall 23. As the center through slot 26 is formed at a center of the rear end wall 23, the feeding slot 201 is non-coaxially formed at the rear end wall 23 of the replaceable freezer cylinder 20.

According to the preferred embodiment, the heat exchanger 10 is a built-in module in an immovable and non-detachable manner in the ice cream or yogurt machine. In other words, unless there is a malfunction of the heat exchanger 10, such as refrigerant leakage, the heat exchanger 10 should not be removed from the ice cream or yogurt machine for cleaning purpose. For cleaning purpose, the detachable components are the replaceable freezer cylinder 20, the front cover panel 40, and the beater device 51.

The cleaning method of the expansion evaporator of the ice cream or yogurt machine comprises the following steps.

(A) Remove the detachable components from the heat exchanger 10. Firstly, the front cover panel 40 is detached from the front side 107 of the heat exchanger 10 to expose the delivering end 102 thereof and the outer biasing rim 24. Secondly, the beater device 51 can be slid out of the feeding channel 21 of the replaceable freezer cylinder 20 and, at the same time, the rear axle shaft 513 is detached from the motor device 52. Then, the pusher member 252 is actuated to push toward the front side 107 of the heat exchanger 10, so as to slightly slid the replaceable freezer cylinder 20 out of the receiving channel 103 of the heat exchanger 10. Having the clearance formed between the outer biasing rim 24 and the front side 107 of the heat exchanger 10, the operator is able to hold the outer biasing rim 24 and pull out the replaceable freezer cylinder 20 from the receiving channel 103 of the heat exchanger 10.

(B) Rinse the detachable components. Accordingly, the operator is able to rinse the feeding channel 21 of the replaceable freezer cylinder 20 where raw material being fed therein to heat exchange with the heat exchanger 10. In other words, the replaceable freezer cylinder 20, the front cover panel 40 with the material outlet tube 41, and the beater device 51 can be detached and cleaned. The beater device 51 can be rinsed to clean the mixing paddle 511 and the scraper blade 512. All the detachable components can be collected and cleaned centrally to fulfill the food hygiene requirements.

(C) Attach the detachable components back to the heat exchanger 10. Firstly, the replaceable freezer cylinder 20 is slid back into the receiving channel 103 of the heat exchanger 10. It is ensured that the pusher member 252 is not protruded from the pusher slot 251, such that the outer biasing rim 24 can be biased against the front side 107 of the heat exchanger 10 to minimize the clearance therebetween. Secondly, the beater device 51 can be slid into the feeding channel 21 of the replaceable freezer cylinder 20 to couple the rear axle shaft 513 to the motor device 52. Then, the front cover panel 40 is coupled to the front side 107 of the heat exchanger 10 to cover the delivering end 102 thereof and the outer biasing rim 24.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An expansion evaporator of an ice cream or yogurt machine, comprising:
   a heat exchanger having a receiving channel and a heat exchange channel for guiding a flow of refrigerant passing therethrough; and
   a replaceable freezer cylinder detachably and slidably received within said receiving channel, wherein said replaceable freezer cylinder has a feeding channel for raw material feeding therethrough, wherein when said replaceable freezer cylinder is slid into said receiving channel, said replaceable freezer cylinder is thermally conducted with said heat exchanger for heat exchanging the raw material within said feeding channel of said replaceable freezer cylinder with the refrigerant within said heat exchange channel so as to form a frozen product within said feeding channel, wherein said replaceable freezer cylinder comprises a surrounding wall defining said feeding channel and an outer biasing rim outwardly and transversely extended from a front open end of said surrounding wall to bias against a front side of said heat exchanger when said replaceable freezer cylinder is slid into said receiving channel, wherein said outer biasing rim functions as a handle frame to slide said replaceable freezer cylinder in and out said receiving channel and also functions as a guiding frame to guide the sliding location of said replaceable freezer cylinder, wherein when said replaceable freezer cylinder is detached from said heat exchanger, said feeding channel of said replaceable freezer cylinder is adapted for being cleaned and rinsed while the raw material is not contacted with said heat exchanger to keep the heat exchanger clean.

2. The expansion evaporator, as recited in claim 1, further comprising a beater device detachably supported within said feeding channel and a motor device detachably coupled to said beater device to drive said beater device to rotate within said feeding channel for stirring the raw material therein.

3. The expansion evaporator, as recited in claim 1, wherein said heat exchanger is a built-in module in an immovable and non-detachable manner.

4. The expansion evaporator, as recited in claim 1, wherein said heat exchanger has a feeding end and a dispensing end to define said receiving channel therebetween, wherein said feeding channel of said replaceable freezer cylinder communicates between said feeding end and said dispensing end of said heat exchanger.

5. The expansion evaporator, as recited in claim 4, wherein said heat exchanger comprises an outer guiding duct and an inner guiding duct enclosed within said outer guiding duct to define said receiving channel within said inner guiding duct, wherein said heat exchange channel is formed between said outer and inner guiding ducts and is extended in a spiral manner around said inner guiding duct for guiding the refrigerant to flow around said inner guiding duct.

6. The expansion evaporator, as recited in claim 5, wherein said replaceable freezer cylinder is coaxially coupled within said inner guiding duct which is coaxially enclosed within said outer guiding duct.

7. The expansion evaporator, as recited in claim 6, wherein when said replaceable freezer cylinder is slid into said receiving channel, said replaceable freezer cylinder has a feeding inlet alignedly coupled at said feeding end of said heat exchanger for allowing the raw material being fed into said feeding channel therefrom, and a feeding outlet alignedly coupled at said dispensing end of said heat exchanger for dispensing the frozen product from said feeding channel.

8. The expansion evaporator, as recited in claim 6, wherein said surrounding wall thermally contacted with an inner duct wall of said inner guiding duct when said replaceable freezer cylinder is received within said receiving channel of said inner guiding duct, wherein a diameter of said receiving channel matches with an outer diameter of said surrounding wall to ensure said surrounding wall being tightly contacted with said inner guiding duct.

9. The expansion evaporator, as recited in claim 8, wherein said surrounding wall of said replaceable freezer cylinder is a taper circular wall extending from a rear end to a front end of said surrounding wall, wherein said receiving channel of said heat exchanger is also in taper shape that an inner diameter of said dispensing end of said heat exchanger to match with said surrounding wall of said replaceable freezer cylinder.

10. The expansion evaporator, as recited in claim 9, wherein a diameter of said front end of said surrounding wall is smaller than a diameter of said rear end of said surrounding wall, wherein an inner diameter of said dispensing end of said heat exchanger, which matches said diameter of said front end of said surrounding wall of said replaceable freezer cylinder, is smaller than said feeding end of said heat exchanger, which matches with said diameter of said front end of said surrounding wall of said replaceable freezer cylinder.

11. The expansion evaporator, as recited in claim 8, wherein said replaceable freezer cylinder further comprises a rear end wall integrally extended from said surrounding wall to face toward said feeding end of said heat exchanger.

12. The expansion evaporator, as recited in claim 11, wherein when said replaceable freezer cylinder is slid into said receiving channel, said replaceable freezer cylinder has a feeding inlet alignedly coupled at said feeding end of said heat exchanger for allowing the raw material being fed into said feeding channel therefrom, and a feeding outlet alignedly coupled at said dispensing end of said heat exchanger for dispensing the frozen product from said feeding channel.

13. The expansion evaporator, as recited in claim 12, wherein said feeding inlet of said replaceable freezer cylinder is formed at said rear end wall thereof while said feeding outlet is defined at said front open end of said surrounding wall.

14. The expansion evaporator, as recited in claim 12, further comprising a rear frame coupled at said feeding end of said heat exchanger to enclose said inner guiding duct, wherein said rear frame comprises a material delivering tube having an inlet end for connecting to a material source and an outlet end sealedly coupled with said replaceable freezer cylinder and extended into said feeding channel of said replaceable freezer cylinder for feeding the raw material thereinto through said material delivering tube, wherein said material delivering tube is detached from said heat exchanger when said replaceable freezer cylinder is detached from said heat exchanger.

15. The expansion evaporator, as recited in claim 14, wherein said replaceable freezer cylinder further has a feeding slot formed at said rear end wall that said material inlet tube extended into said feeding channel and inserted into said feeding slot when said replaceable freezer cylinder is slid into said heat exchanger.

16. The expansion evaporator, as recited in claim 15, further comprising a front cover panel detachably coupled at said front side of said heat exchanger to seal and cover said delivering end thereof after said replaceable freezer cylinder is slid into said heat exchanger, wherein said front cover panel has a material outlet tube extended therefrom to communicate with said feeding channel of said replaceable freezer cylinder, wherein said front cover panel is detached from said heat exchanger for cleaning said material outlet tube.

17. The expansion evaporator, as recited in claim 16, wherein said outer biasing rim of said replaceable freezer cylinder is sandwiched between said front side of said heat exchanger and said front cover panel.

18. The expansion evaporator, as recited in claim 17, further comprising a beater device detachably supported within said feeding channel and a motor device detachably coupled to said beater device to drive said beater device to rotate within said feeding channel for stirring the raw material therein.

19. The expansion evaporator, as recited in claim 18, wherein said beater device comprises a front axle shaft extended toward at said dispensing end of said heat exchanger and a rear axle shaft extended through said rear end wall of said replaceable freezer cylinder to detachably couple with said motor device.

20. The expansion evaporator, as recited in claim 19, wherein said replaceable freezer cylinder further has a center through slot formed at said rear end wall that said rear axle shaft of said beater device is extended through said center through slot of said replaceable freezer cylinder.

21. The expansion evaporator, as recited in claim 20, wherein said feeding slot is non-coaxially formed at said rear end wall of said replaceable freezer cylinder.

22. The expansion evaporator, as recited in claim 11, further comprising a rear frame coupled at said feeding end of said heat exchanger to enclose said inner guiding duct, wherein said rear frame comprises a material delivering tube having an inlet end for connecting to a material source and an outlet end detachably extended into said feeding channel of said replaceable freezer cylinder for feeding the raw material thereinto through said material delivering tube.

23. The expansion evaporator, as recited in claim 22, wherein said replaceable freezer cylinder further has a feeding slot formed at said rear end wall that said material inlet tube extended into said feeding channel and inserted into said feeding slot when said replaceable freezer cylinder is slid into said heat exchanger.

24. The expansion evaporator, as recited in claim 22, further comprising a front cover panel detachably coupled at said front side of said heat exchanger to seal and cover said delivering end thereof after said replaceable freezer cylinder is slid into said heat exchanger, wherein said front cover panel has a material outlet tube extended therefrom to communicate with said feeding channel of said replaceable freezer cylinder.

25. The expansion evaporator, as recited in claim 24, wherein said outer biasing rim of said replaceable freezer cylinder is sandwiched between said front side of said heat exchanger and said front cover panel.

26. A replaceable freezer cylinder for an ice cream or yogurt machine which comprises a heat exchanger having a receiving channel and a heat exchange channel for guiding a flow of refrigerant passing therethrough, wherein said replaceable freezer cylinder comprises:

a surrounding wall for thermally contacting with the heat exchanger when said replaceable freezer cylinder is slid into the receiving channel of the heat exchanger, wherein said surrounding wall defines a feeding channel therewithin for raw material feeding therethrough, wherein said replaceable freezer cylinder is arranged for detachably and slidably receiving within the receiving channel for heat exchanging the raw material within said feeding channel of said replaceable freezer cylinder with the refrigerant within said heat exchange channel so as to form a frozen product within said feeding channel, such that said replaceable freezer cylinder is capable of detaching from the heat exchanger for cleaning and rinsing said feeding channel while the raw material is not contacted with the heat exchanger to keep the heat exchanger clean, wherein said replaceable freezer cylinder further comprises an outer biasing rim outwardly and transversely extended from a front open end of said surrounding wall to bias against a front side of the heat exchanger when said replaceable freezer cylinder is slid into the receiving channel, so as to function as a handle frame to slide said replaceable freezer cylinder in and out the receiving channel and also function as a guiding frame to guide the sliding location of said replaceable freezer cylinder.

27. The replaceable freezer cylinder, as recited in claim 26, further comprising a rear end wall integrally extended from said surrounding wall at one end thereof to form a closed end.

28. The replaceable freezer cylinder, as recited in claim 27, further comprising a feeding slot formed at said rear end wall for introducing the raw material into said feeding channel through feeding slot.

29. The replaceable freezer cylinder, as recited in claim 28, further comprising a center through slot formed at said rear end wall for allowing a rear axle shaft of a beater device extended through said center through slot when the beater device is detachably supported within said feeding channel.

30. The replaceable freezer cylinder, as recited in claim 29, further comprising a pusher arrangement provided at said outer biasing rim for removing said surrounding wall away from said receiving channel.

31. The replaceable freezer cylinder, as recited in claim 30, wherein said pusher arrangement comprises a threaded pusher slot formed at said outer biasing rim and a pusher member rotatably coupled at said pusher slot and arranged for pushing against the front side of the heat exchanger when said pusher member is rotated.

32. The replaceable freezer cylinder, as recited in claim 27, further comprising a pusher arrangement provided at said outer biasing rim for removing said surrounding wall away from said receiving channel.

33. The replaceable freezer cylinder, as recited in claim 32, wherein said pusher arrangement comprises a threaded pusher slot formed at said outer biasing rim and a pusher member rotatably coupled at said pusher slot and arranged for pushing against the front side of the heat exchanger when said pusher member is rotated.

* * * * *